3,539,609
PROCESS FOR PREPARING ORGANIC 1,3-DI-(HALOGENOSILYL) - 1,3,2,4 - DIAZADISILET-IDINES AND THE PRODUCTS

Walter Fink, Zurich, Switzerland, assignor to Monsanto Company, St. Louis, Mo., a corporation of Delaware
No Drawing. Filed Aug. 7, 1967, Ser. No. 658,629
Claims priority, application Switzerland, Oct. 21, 1966, 15,410/66
Int. Cl. C07d *103/02, 103/04;* C07f *7/10*
U.S. Cl. 260—448.2                9 Claims

ABSTRACT OF THE DISCLOSURE

A process for making compounds of formula

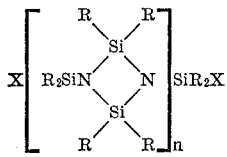

by heating a cyclic silazane of formula $[R_2SiNH]_a$ with a dihalosilane of formula $R_2SiX_2$. The novel compounds are useful as intermediates to form lubricants and heat transfer agents.

---

The present invention relates to a process for preparing organic 1,3-di-(halosilyl)-1,3,2,4-diazadisiletidines and their condensation products of the general formula (A)

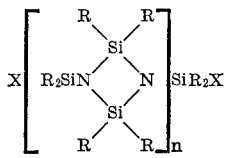

wherein the R's are identical or different and signify possibly substituted and/or ethylenically or acetylenically unsaturated hydrocarbon groups or heterocyclic groups, or partially also hydrogen atoms, fluorine atoms or silyl groups of the formulae $SiR'_3$, $SiR'_2SiR'_3$, $Si(SiR'_3)_2R$ or $Si(SiR'_3)_3$ (R'=organic group as defined for R, or partially also hydrogen atoms or fluorine atoms) or two groups R on the same silicon atom are members of a heterocyclic group, X signifies a chlorine atom, bromine atom or iodine atom, and $n$ represents the degree of condensation.

Compounds of the above mentioned formula where X is a chlorine atom could previously be obtained by reacting cyclotrisilazanes or cyclotetrasilazanes, which are at least doubly alkali metallated, with a diorganodichlorosilane [W. Fink, Angew. Chem., 78, 803 (1966)].

A compound having R=methyl and belonging to the same class has been obtained by reacting 1,3-dichloro-tetramethyldisilazane with sodium-bis-(trimethylsilyl)-amide [P. Geymayer and E. G. Rochow, Angew. Chem., 77, 618 (1965)]. Polymeric diazadisiletidines having $n=2$ or greater have not been known up to now.

A simple process has now been found for preparing organic 1,3-di-(halosilyl)-1,3,2,4-diazadisiletidines and condensed derivatives thereof which does not need the use of alkali metals.

The process is characterized in that a cyclic silazane of the general formula (B)                [$R_2SiNH$]$_a$ wherein R is defined as before and $a$ represents 3 or 4, is heated with a dihalosilane of the general formula (C)                $R_2SiX_2$ wherein R and X are defined as before.

Examples of the groups R are fluorine atoms; alkyls, alkenyls and alkynyls such as methyl, ethyl, vinyl, ethynyl, n-propyl, iso-propyl, allyl, propenyl, propargyl, propynyl, n-butyl, iso-butyl, sec-butyl, tert-butyl, methallyl, 1-butenyl, crotyl, butadienyl, 1-butynyl, 2-butynyl, 1-buten-2-ynyl and higher aliphatic groups showing up to 24 carbon atoms like undecenyl, dodecyl, myristyl, oleyl and tetracosyl; moreover cycloalkyls, cycloalkenyls and cycloalkynyls such as cyclobutyl, cyclopentyl, cyclopentenyl, cyclopentadienyl, cyclohexyl, cyclohexenyl, cyclohexadienyl, cyclohexynyl and greater alicyclic groups having up to 12 carbon atoms like cyclooctyl, cyclododecyl, cyclooctatrienyl, cyclododecatrienyl and bicyclohexyl; aralkyls, aralkenyls and aralkynyls such as benzyl, cuminyl, phenylethyl, styryl, phenylethynyl, phenylpropyl, 3-phenylallyl, 2-phenylallyl, 1-phenylallyl, cinnamyl, 1-phenylpropynyl, 1-phenylpropargyl, diphenylmethyl, triphenylmethyl, α-naphthylmethyl, β-naphthylmethyl, 1-(α-naphthyl)-ethyl, 2-(α-naphthyl)-ethyl, 1-(β-naphthyl)-ethyl, 2-(β-naphthyl)-ethyl, 1-(α-naphthyl)-ethenyl, 2-(α-naphthyl)-ethenyl, 1-(β-naphthyl)-ethenyl, 2-(β-naphthyl)-ethenyl, α-naphthylethynyl and β-naphthylethynyl; moreover alkaryls, alkenylaryls and alkynylaryls such as tolyl, xylyl, mesityl, duryl, ethylphenyl, cumyl, vinylphenyl, ethynylphenyl, propargylphenyl, propynylphenyl, tert-butylphenyl, α-vinylnaphthyl, β-vinylnaphthyl, α-ethynylnaphthyl and β-ethynylnaphthyl; moreover aryls such as phenyl, o-biphenylyl, m-biphenylyl, p-biphenylyl, m-terphenylyl, p-terphenylyl, 1-naphthyl, 2-naphthyl, 2-anthryl, 9-anthryl, 1-phenanthryl, 2-phenanthryl, 3-phenanthryl, 4-phenanthryl, 9-phenanthryl, indanyl, indenyl; moreover heterocyclic groups such as pyrryl, furyl, tetrahydrofuryl, benzofuryl, thienyl, pyrrolinyl, pyrrolidyl, pyrazolyl, pyrazolinyl, pyrazolidyl, imidazolyl, benzimidazolyl, thiazolyl, oxazolyl, iso-oxazolyl, triazolyl, pyrazinyl, pyrimidyl, pyridazinyl, pyridyl, pyranyl, thiopyranyl, piperidyl, morpholinyl, thiazinyl, triazinyl, quinolyl, quinazolyl, indolyl, phenazinyl, carbazolyl etc.

Cyclotrisilazanes and cyclotetrasilazanes are suitable as reactants (B). From the technical literature there are known, for example, cyclotrisilazanes having R=methyl, ethyl, n-butyl or phenyl; and, for example, cyclotetrasilazanes having R=methyl or ethyl; also analogous compounds having on the same silicon atoms two different substituents, for example, cyclotrisilazanes having $R_2$=hydrogen and methyl, ethyl or phenyl; or methyl and ethyl, 2-bromoethyl, pentafluoroethyl, 1,1,2,3,3,3-hexafluoro-n-propyl, phenyl, vinyl or allyl; and, for example, cyclotetrasilazanes having $R_2$=hydrogen and methyl or ethyl; or methyl and vinyl. Cyclotrisilazanes or cyclotetrasilazanes whose silicon atoms bear different substituents or substituent pairs are also suitable. Well-known unsymmetrically substituted cyclotrisilazanes are, for example, 2,2,4,4-tetramethyl-6,6-diethyl-cyclotrisilazane, 2,2,4,4-tetraethyl-6,6-dimethyl-cyclotrisilazane, 2,2,4,6 - tetramethyl-4,6-diphenyl-cyclotrisilazane, 2,2 - diethyl-4,6-dimethyl-4,6-divinyl-cyclotrisilazane and 2,2,4,6 - tetramethyl - 4,6 - diallyl-cyclotrisilazane; and a well-known unsymmetrically substituted cyclotetrasilazane is, for example, 2,2,4,4-tetramethyl-6,8-dimethyl-6,8-divinyl-cyclotetrasilazane, or 2,2,6,6 - tetramethyl - 4,8 - dimethyl - 4,8 - divinyl - cyclotetrasilazane, or a mixture of both.

Optional halosilanes containing at least one reactive halogen atom linked to the silicon atom serve as further reactants (C). Some suitable halosilanes are followingly cited in order to illustrate the possibilities of combining the groups R: dichloro-dihydrogenosilane, dimethyl-dichlorosilane, diphenyl-dichlorosilane, methyl-hydrogenodichlorosilane, phenyl-hydrogeno-dichlorosilane, methylphenyl-dichlorosilane, methyl-fluoro-dichlorosilane, phenyl-fluoro-dichlorosilane. Multifunctional dihalosilanes such as bis-dichlorosilyl-methane, 1,2-bis-dichlorosilyl-ethane, 1,3 - bis-dichlorosilyl-propane, 1,2 - bis-dichlorosilyl-propane, ortho-, meta- and para-bis-dichlorosilyl-benzene, α- and β-bis-dichlorosilyl-naphthalene are also comprised.

Also, halosilanes in which the groups R are members of a heterocyclic group are also comprised. Examples of starting compounds are 1,1-dichloro-silacyclobutane, 1,1-dichloro-silacyclopentane, 1,1,4,4-tetrachloro-1,4-disilacyclohexane, 1,1,3,3,5,5-hexachloro-1,3,5-trisilacyclohexane and 1-methyl-4,4-dichloro-1,4-azasilacyclohexane.

Instead of chlorides there can also be reacted bromides and iodides, although the less expensive and technically more available chlorides are generally preferred.

The reaction of invention apparently proceeds through different intermediary steps. When, for example, hexamethylcyclotrisilazane and dimethyldichlorosilane are heated in a ratio of 1:1, dimethyldichlorosilane is consumed and the temperature of the mixture gradually rises on sufficient heating. After 1 hour and at 200° C. all dimethyldichlorosilane is used up. During the temperature increase, ammonium chloride is formed in the mixture which sublimes to the upper colder parts of the apparatus. The sublimation of ammonium chloride generally begins at about 150° C., which temperature can be reached after about 40 minutes. When the dimethyldichlorosilane is consumed, the liquid mixture can now contain up to about 60% of 1,3-bis-(dimethylchlorosilyl)-2,2,4,4-tetramethyl-1,3,2,4-diazadisiletidine, which can be easily separated by distillation.

In order to get condensed products having two or more cyclodisilazane rings in the molecule, the mixture is heated in the course of about 10 to 24 hours to a temperature of about 280° to 350° C. Dimethyldichlorosilane is formed by cleavage, and should escape from the reaction mixture. Up to about 280° C. there are formed mainly products having condensation degrees of $n=1$ and $n=2$, besides a relatively small quantity of a product having $n=3$. At still higher temperatures, e.g. at 300° to 350° C. the degree of condensation of the end products increases.

The molar ratio of the cyclotrisilazane/dihalosilane can also be smaller or greater than 1:1. However, expediently it is within the range of 1:1 to 1:2 in order to prepare relatively low condensed products having $n=2$ to 10. Using a cyclotetrasilazane the appropriate molar ratio is about 1:1.33 to 1:2.66.

The organic cyclotrisilazanes and cyclotetrasilazanes reacted contain on their silicon atom at least one organic group linked through a carbon atom. Besides the organic groups there can be present on the silicon atoms also hydrogen atoms, fluorine atoms, or silyl groups as described at the beginning of the specification.

The reaction can be finished faster with reactive dihalosilanes which are higher boiling than dimethyldichlorosilane, since the intermediate reaction products also possess higher boiling points and consequently the necessary high temperatures can be reached in a shorter time. The process can also be worked by applying pressure until the lower boiling dihalosilanes are consumed.

It has further been found, that the easily preparable organic 1,3-di-(halosilyl)-1,3,2,4-diazadisiletidines, which occur in the above described reaction also as intermediates, can be further condensed when they can be brought to a sufficiently high temperature, e.g. 280° to 350° C. and care is taken that the cleaved dihalosilane is separated from the condensed products as fast as possible.

This reaction is expediently conducted in the presence of a catalyst, e.g. a Lewis acid. Suitable equipments allowing the continuous introduction of the starting product and the continuous removal of the cleavage product and the end product from the reaction mass are well-known in the technical art from similar reactions.

The 1,3-di-(halosilyl)-1,3,2,4-diazadisiletidines which have not been known up to now are valuable intermediates. The terminal reactive halogen atoms in known manner can be hydrolyzed or be exchanged for other groups, for example, organic groups or metallorganic groups, also fluorine atoms, whereby products are formed which are useful, for example, as heat transfering agents or lubricants and which can endure relatively high temperatures.

EXAMPLE 1

43.9 g. (0.2 mole) of hexamethylcyclotrisilazane and 25.8 g. (0.2 mole) of dimethyldichlorosilane are heated within 18 to 24 hours up to 305° C. The ammonium chloride formed in the reaction sublimes and deposits on the colder parts of the apparatus (flask with cooler). A temperature of 200° C. is reached within about 1 hour and the dimethyldichlorosilane is consumed. At a temperature of 280° C. the cooling water is turned off so that the dimethyldichlorosilane now formed by the reaction can escape. The liquid mixture is separated from the ammonium chloride which is practically completely deposited on the upper flask wand and on the cooler. The ammonium chloride crust is washed with light petroleum and the solution combined with the mixture. The liquid residue remaining after distillation of the light petroleum is taken as 100% and fractionally distilled. The temperature ranges of the fractions are selected so that the boiling ranges of the compounds showing a defined polymerization degree are included.

In a further experiment the mixture is heated up to 325° C. and worked up as indicated above.

The obtained fractions are followingly shown.

Reaction temperature,° C. _____ 305
Boiling range, ° C./0.005 mm.:
  To 150 _____percent__ 52.4
  150–220 _____do____ 22.6
  220–280 _____do____ 13.0
  280–350 _____do____ 6.7
  Residue _____do____ 4.8

According to gas chromatographic analysis the fraction having a boiling range til 150° C. contains 43.8% of the compound having $n=1$ and 8.6% of the compound having $n=2$, based on the total mixture.

Reaction temperature, ° C. _____ 325
Boiling range, ° C./0.005 mm.:
  To 150 _____percent__ 28.3
  150–220 _____do____ 28.7
  220–280 _____do____ 18.4
  280–350 _____do____ 12.8
  Residue _____do____ 10.5

According to gas chromatographic analysis the fraction having a boiling range of til 150° C. contains 24.8% of the compound having $n=1$ and 3.5% of the compound having $n=2$.

From the two compilations it is apparent that at higher reaction temperatures the higher condensed products are preponderant. The residue consists of compounds having $n>5$.

On further fractional distillation of the above cited fractions there are obtained the well-known compound having $n=1$ and the novel compounds having $n=2$; B.P. 118° C./0.05 mm.; M.P. 43.5° C.; $n_D^{20}$ 1.4635:

Analysis.—Calc'd for $C_{14}H_{42}N_4Si_7Cl_2$ (percent): C, 31.29; H, 7.93; N, 10.49; Cl, 13.28; mol. weight, 534. Found (percent): C, 31.31; H, 7.82; N, 10.61; Cl, 13.05; mol. weight, 521 (in benzene).

$n=3$; B.P. 186° C./0.01 mm.; M.P. 109–110° C. (flowing point):

Analysis.—Calc'd for $C_{20}H_{60}N_6Si_{10}Cl_2$ (percent): C, 32.59; H, 8.21; N, 11.46; Cl, 9.62; mol. weight, 736.99. Found (percent): C, 33.00; H, 7.99; N, 11.46; Cl, 9.32; mol. weight, 728 (in benzene).

$n=4$; B.P. 248° C./0.01 mm.; M.P. 93° C. (flowing point):

Analysis.—Calc'd for $C_{26}H_{78}N_8Si_{13}Cl_2$ (percent): C, 33.26; H, 8.37; N, 11.93; Cl, 7.55; mol. weight, 939.05.

Found (percent): C, 33.63; H, 8.34; N, 11.97; Cl, 7.33; mol. weight, 1088 (in benzene).

$n=5$; B.P. 287° C./0.005 mm.; M.P. 149–152° C.:

Analysis.—Calc'd for $C_{32}H_{96}N_{10}Si_{16}Cl_2$ (percent): C, 33.67; H, 8.48; N, 12.27; Cl, 6.21; mol. weight, 1141.55. Found (percent): C, 33.81; H, 8.51; N, 12.35; Cl, 6.58; mol. weight, 1192 (in benzene).

$n=6$; B.P. 315° C./0.05 mm.; M.P. 147° C.:

Analysis.—Calc'd for $C_{38}H_{114}N_{12}Si_{19}Cl_2$ (percent): C, 33.96; H, 8.55; N, 12.51; Cl, 5.26; mol. weight, 1344.0. Found (percent): C, 34.10; H, 8.49; N, 12.58; Cl, 5.16; mol. weight, —.

EXAMPLE 2

219 g. (1 mole) of hexamethylcyclotrisilazane and 258 g. (2 mole) of dimethylchlorosilane were refluxed for 13–15 hours until the mixture reached a temperature of 240° C. at 150–160° C. NH$_4$Cl (30.6 g., 0.57 mole) is formed and deposits on the colder parts of the apparatus. The distillation of the oligomeric reaction products (419.3 g.) yields the following fractions.

Boiling range:

104–124° C./12 mm. ___ 291.9 g. (70.4%) of the well-known compound having $n=1$.

116–118° C./0.05 mm. __ 24.6 g. (6.3%) of the compound having $n=2$.

118–250° C./0.05 mm. __ 22.2 g. mixture of higher oligomers having $n>2$.

What is claimed is:

1. A process for preparing organic 1,3-di(halosilyl)-1,3,2,4-diazadisiletidines and condensation products thereof having the general formula

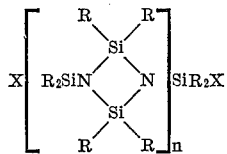

wherein the R's are 1 to 4 carbon alkyl or phenyl groups of 1 to 24 carbon atoms or partially also hydrogen atoms, X signifies a chlorine atom, bromine atom or iodine atom, and $n$ represents the degree of condensation, comprising heating a cyclic silazane of the general formula

[R$_2$SiNH]$_a$ wherein R is defined as above and $a$ stands for 3 or 4, with a dihalosilane of the general formula R$_2$SiX$_2$ wherein R and X are defined as above, at least at a temperature at which said dihalosilane is consumed in the reaction.

2. A process of claim 1 wherein said reactants are gradually heated up to a temperature at which dihalosilane formed by the reaction is split off and said dihalosilane is continuously removed from the reaction mixture.

3. A process of claim 1 wherein a cyclotrisilazane ($a=3$) and a dihalosilane in a molar ratio of about 1:1 to 1:2 are used.

4. A process of claim 1 wherein a cyclotetrasilazane ($a=4$) and a dihalosilane in a molar ratio of about 1:1.33 to 1:2.66 are used.

5. A process of claim 1 wherein hexamethylcyclotrisilazane, or octamethylcyclotetrasilazane, and dimethyldichlorosilane in a molar ratio of about 1:1, or 1:1.33, respectively, are gradually heated to at least about 280° C.

6. A process of claim 5 wherein said reactants are heated to about 350° C.

7. A compound of the general formula

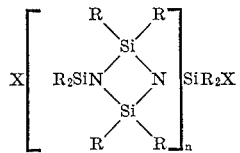

wherein the R's are 1 to 4 carbon alkyl or phenyl groups 1 to 24 carbon atoms, or partially also hydrogen atoms, X signifies a chlorine atom, bromine atom or iodine atom, and $n$ represents an integer of at least 2.

8. A compound of claim 7 wherein R represents a methyl group and X a chlorine atom.

9. A compound of claim 8 wherein $n$ represents an integer of 2–10.

References Cited

UNITED STATES PATENTS

| | | | |
|---|---|---|---|
| 3,098,830 | 7/1963 | Rochow | 260—448.2 XR |
| 3,140,288 | 7/1964 | Peake | 260—448.2 XR |
| 3,146,250 | 8/1964 | Speier | 260—448.2 |
| 3,159,668 | 12/1964 | Rochow | 260—448.2 |
| 3,170,941 | 2/1965 | Speier | 260—448.2 |
| 3,291,760 | 12/1966 | Bayer | 260—448.2 XR |
| 3,297,592 | 1/1967 | Fink | 260—448.2 |
| 3,393,218 | 7/1968 | Van Wazer et al. | 260—448.2 |

OTHER REFERENCES

Wannagat: J. Organometal. Chem., 6 (1966), 676–677.
Wannagat: Angew. Chem. Internat. Ed., 4 (1965), 605.

HELEN M. McCARTHY, Primary Examiner
P. F. SHAVER, Assistant Examiner

U.S. Cl. X.R.

252—49.6, 78; 260—46.5